(12) United States Patent
Ebersberger et al.

(10) Patent No.: US 7,143,000 B2
(45) Date of Patent: Nov. 28, 2006

(54) COMPUTER-ASSISTED METHOD FOR CALCULATING THE TEMPERATURE OF A SOLID BODY

(75) Inventors: Johannes Ebersberger, Erlangen (DE); Heinrich Wallschläger, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/051,357

(22) Filed: Feb. 4, 2005

(65) Prior Publication Data

US 2005/0190885 A1 Sep. 1, 2005

(30) Foreign Application Priority Data

Feb. 6, 2004 (DE) ............... 10 2004 005 937

(51) Int. Cl.
*G01N 25/18* (2006.01)

(52) U.S. Cl. .............. 702/130; 134/136; 134/40; 378/51; 378/58; 378/118; 209/576; 209/589

(58) Field of Classification Search ........... 702/130, 702/131, 132, 134, 136, 40; 378/58, 51, 378/117, 118, 132; 209/576, 589
See application file for complete search history.

(56) References Cited

U.S. PATENT DOCUMENTS

| 5,583,780 A | * 12/1996 | Kee et al. .............. 700/117 |
| 5,838,763 A | 11/1998 | Hiller et al. |
| 6,377,657 B1 | 4/2002 | Scholz |
| 2004/0213379 A1 | 10/2004 | Bittl |

* cited by examiner

*Primary Examiner*—John Barlow
*Assistant Examiner*—Hien Vo
(74) *Attorney, Agent, or Firm*—Schiff Hardin LLP

(57) ABSTRACT

In a method for calculating the temperature T of a solid body or the time t that is needed for a change of the temperature T of the solid body, a solution function to a dimensionless equation corresponding to the differential equation $dT/dt = b - aT^4 - cT$, is determined and used to create a matrix $\underline{A} = (a_{ij})$ with which T or t can be easily calculated.

10 Claims, 1 Drawing Sheet

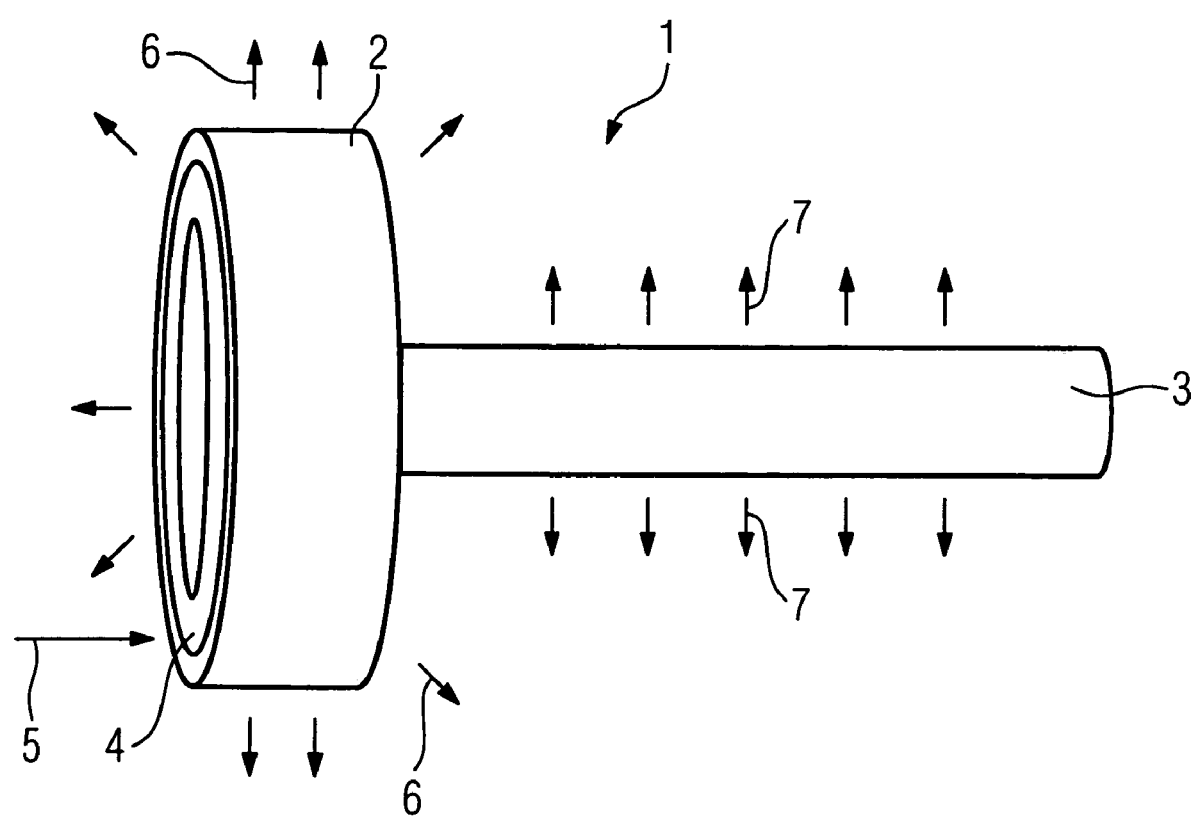

COMPUTER-ASSISTED METHOD FOR CALCULATING THE TEMPERATURE OF A SOLID BODY

BACKGROUND OF THE INVENTION

1. Field of the Invention

The present invention concerns a computer-assisted method for calculation of temperature of a solid body, or the time needed to change the temperature of a solid body. In particular, the invention concerns a computer-assisted method for making such a calculation for an anode of an x-ray tube.

2. Description of the Prior Art

For controlling the operating parameters of rotary piston x-ray tubes as described for example in German OS 196 31 899, German PS 198 10 346, and German PS 197 41 750 there is a need to determine the temperature of the anode.

A method and load calculator for the calculation of the spatiotemporal temperature distribution of an anode of an x-ray tube is known from German OS 198 11 041. With this known method it is possible to protect an x-ray device from overload conditions and simultaneously to operate it at optimally fully loaded conditions. A disadvantage of this method is that the calculation of the spatiotemporal temperature distribution, due to the high calculation effort, is time consuming. The method is not universally applicable. It must be adapted to the conditions of the x-ray tube in question and the physical state of the anode. That is expensive in time and cost.

SUMMARY OF THE INVENTION

An object of the present invention is to eliminate the aforementioned disadvantages in a method for making a calculation of this type. The method should in particular be a fast, simple, and as much as possible, accurate method, which allows a calculation of the temperature of an anode of an x-ray tube. Furthermore this method should allow a fast, simple, and as much as possible, accurate calculation of the time needed for a change of the temperature. A further object of the invention is to provide such a method that can be adapted to different physical characteristic of the anode, different x-ray tube geometries, different design types of x-ray tubes, as well as different load conditions in a simple way.

This object is achieved in accordance with the invention by a method for the calculation of the temperature T of a solid body or the time $\tau$ needed for a change of the temperature of a solid body, including the steps of:

i) defining a differential equation $$dT/dt = b - aT^4 - cT$$

wherein

T is the temperature of a solid body t is time b is per unit time temperature change caused by energy absorption $\Delta T_{EA}$, $aT^4$ is the per unit time temperature change $\Delta T_{ES}$ caused by heat radiation, and cT is the per unit time temperature change caused by conductance of heat $\Delta T_{WA}$, ii) converting the differential equation into the following dimension-free (dimensionless) differential equation:

$$d\vartheta/d\tau = 1 - \pi\vartheta - \vartheta^4$$

wherein $\vartheta$ is dimensionless temperature $\tau$ is dimensionless time, $\pi$ is dimensionless heat conductivity, iii) determining, and programming a computer with a function $\vartheta(\tau)$ or its inverse function $\tau(\vartheta)$ that is a solution to the dimensionless differential equation, and compiling a matrix $\underline{A}=(a_{ij})$, with i=1, 2; j$\in$N; $a_{1j}=\tau_j$ and $a_{2j}=\vartheta_j$, for which $\vartheta(\tau)$ at the values $\tau_j$ makes: $\vartheta_j=\vartheta(\tau_j)$ and $\tau(\vartheta)$ at the values $\vartheta_j$ makes $\tau_j=\tau(\vartheta_j)$; and iv) in the computer, electronically determining the temperature T at time t, or the time t at temperature T, a) calculating $\tau$ or $\vartheta$ for t or T, b) calculating $\vartheta$ or $\tau$ using the values contained in $\underline{A}$, and c) calculating T or t respectively for the values calculated in b) for $\vartheta$ or $\tau$ According to the inventive method, the determination of T or t in step iv) is based on the known values $a_{ij}$ of the matrix $\underline{A}$ created in step iii). The steps lit. iv) a) through c) are not calculationally intensive. They can be implemented quickly. In particular, the calculations in iv) a), c) and b) can be implemented by multiplications with simple scaling factors and linear interpolation between values in $\underline{A}$. In particular, the calculation effort and the calculation time are reduced given repeated calculation of T or t. The size of $\underline{A}$, given by j$\in$N, is freely selectable. As a consequence, T or t can be calculated as precisely as desired. An adaptation of the method to various physical properties of the solid body, differences in the energy consumption, heat radiation and dissipation of heat can be achieved in a simple manner by an exchange of the matrix $\underline{A}$ or of the scaling factors. A change of the calculation method in step iv) is not necessary. Furthermore, the evaluation of either $\vartheta(\tau)$ or $\tau(\vartheta)$ is sufficient for calculation of the values $a_{ij}$ of the matrix $\underline{A}$. The method is itself implementable when the reverse function $\vartheta(\tau)$ of $\tau(\vartheta)$ or $\tau(\vartheta)$ of $\vartheta(\tau)$ is unknown or nonexistent or very difficult to calculate.

According to an embodiment of the invention, the temperature change $\Delta T_{WA}$ caused by dissipation of heat is negligible. Due to $\Pi=0$, the temperature decrease of the solid body is then exclusively caused by heat radiation. Since $\pi$ is constant in this case, the solution functions $\vartheta(\tau)$ and $\tau(\vartheta)$ as well as the values $a_{ij}$ of the matrix $\underline{A}$ depend exclusively on $\tau$ and $\vartheta$. They are independent of a change of the physical properties of the solid body, the energy consumption or the heat radiation. Only the scaling factors have to be adapted. The identical matrix $\underline{A}$ can be used. The same is true for the approximation, according to which $\pi$ is considered as a constant. An adaptation of the method to modified values of a, b and c is thus possible in a simple manner.

In a further embodiment of the invention, $\pi$ is considered as independent of the energy consumption. An adaptation of the calculation to different values of $\Delta T_{EA}$ respectively requires only an exchange of the scaling factors.

The solid body can be an anode of an x-ray tube, and $\Delta T_{EA}$ can be caused by absorption of electrons. Given negligibility of $\Delta T_{WA}$, the method can be applied to a conventional, radiation-cooled x-ray tube. A change of the scaling factors is sufficient for consideration of various load types. The matrix $\underline{A}$ does not have to be changed. Furthermore, the anode of the x-ray tube can be rotatably accommodated in a bearing. For such an x-ray tube, the heat dissipation in the bearing can be accounted for by the temperature change $\Delta T_{WA}$. $\Delta T_{WA}$ can also contain a term that describes a heat dissipation from the anode into a coolant. This enables a precise calculation of T or t.

According to a further embodiment of the invention, the energy consumption of the solid body is controlled by comparison of the temperature T or of the time t with at least one predetermined or calculated limit value for T or t, respectively. The limit values can be determined from the respective operating parameters of an x-ray apparatus. In this embodiment of the invention, the power accepted by the anode or the power released by a cathode is monitored and limited. The x-ray tube and the cooling system can be protected from overheating, failure and damage. The computer of an x-ray computed tomography apparatus in which the x-ray device is installed, which would be available anyways can be used to implement the method. The inventive method imposes no great computational burden on the computer.

DESCRIPTION OF THE DRAWING

The single FIGURE is a schematic illustration of an anode of the type employed in a rotating anode or rotating piston x-ray tube for use in explaining the inventive method.

DESCRIPTION OF THE PREFERRED EMBODIMENTS

The FIGURE schematically shows an anode generally designated 1. A bearing shaft 3 extends from an anode plate 2. The bearing shaft 3 is rotatably borne in a bearing (not shown). A circular focal path 4 that is formed by an electron beam 5 striking the anode plate 2 is located on a top side of the anode 1 facing away from the bearing shaft 3. The heat radiation from the anode plate 2 is designated with 6, and the heat dissipation from the bearing shaft 3 into the bearing is designated with 7. The temporal temperature change $dT_A/dt$ of the anode is appropriately described by the following differential equation:

$$dT_A/dt = P/c_p m - \sigma \epsilon F/c_p m (T_A^4 - T_U^4) - \lambda Q/c_p m l (T_A - T_L)$$

wherein
t denotes time,
$T_A$, $T_L$, $T_U$ denotes the temperature of anode 1, the bearing and the environment, respectively
P denotes the power supplied to the anode 1,
$\lambda$ denotes the heat conductivity of the material of the bearing shaft 3 of the anode 1,
$\sigma$ denotes the Stefan-Bolzmann constant
$\epsilon$ the emissivity of the anode material,
F denotes the heat-radiating surface of the anode plate 2,
Q denotes the cross-sectional area of the bearing shaft 3 of the anode 1,
$c_p$ denotes the specific heat capacity of the anode material,
m denotes the anode mass, and
l denotes the length of the bearing shaft 3.

In the differential equation, the first term describes the temporal temperature change that is caused by the absorption of electrons of the electron beam 5 on the focal path 4. The second and third term of the differential equation describe the temperature changes which are caused by the radiation 6 of energy to the environment and by the heat dissipation 7 from the bearing shaft 3 into the slide bearing.

The dependency of the dimensional temperature $\vartheta$ on the dimension-free time $\tau$ is given by the following dimension-free differential equation:

$$d\vartheta/d\tau = 1 - \Pi\vartheta - \vartheta^4,$$

It is necessary that:

$$\tau = t/t_K, \quad \vartheta = T/T_K, \quad \Pi = (\lambda Q/c_p m l)t_K, \text{ with}$$

$$T_K = (P/\sigma\epsilon F + T_U^4 + \lambda QT_L/(\sigma\epsilon Fl))^{1/4} \text{ and}$$

$$t_k = c_p m / [\sigma\epsilon F(P/\sigma\epsilon F + T_U^4 + \lambda QT_L/\sigma\epsilon Fl)^{3/4}].$$

A general solution $\tau(\vartheta)$ is:

$$T = A_1 \ln|\vartheta - \vartheta_1| + A_2 \ln|\vartheta - \vartheta_2| +$$
$$[(2A_3 + A_4(\vartheta_3 + \vartheta_4)/(\vartheta_3 - \vartheta_4)i] \arctan[(2\vartheta - \vartheta_3 - \vartheta_4)/(\vartheta_3 - \vartheta_4)i] +$$
$$(A_4/2)\ln|\vartheta^2 - (\vartheta_3 + \vartheta_4)\vartheta + \vartheta_3\vartheta_4| + C,$$

wherein $\vartheta_1$, $\vartheta_2$, $\vartheta_3$ and $\vartheta_4$ are the zero points of the polynomials of the right side of the dimension-free differential equation, i is the imaginary unit and C is the integration constant. $\tau(\vartheta_0) = 0$ is valid for an initial temperature $\vartheta_0$. $\vartheta_1$ and $\vartheta_2$ are real, $\vartheta_3$ and $\vartheta_4$ are complex zero points conjugated relative to one another. These are given by:

$$\vartheta_1 = -\tfrac{1}{2}\{(u+v)^{1/2} + [2(u^2 - uv + v^2)^{1/2} - u - v]^{1/2}\}$$

$$\vartheta_2 = -\tfrac{1}{2}\{(u+v)^{1/2}[2(u^2 - uv + v^2)^{1/2} - u - v]^{1/2}\}$$

$$\vartheta_3 = \tfrac{1}{2}\{(u+v)^{1/2} - i[2(u^2 - uv + v^2)^{1/2} + u + v]^{1/2}\}$$

$$\vartheta_4 = \tfrac{1}{2}\{(u+v)^{1/2} + i[2(u^2 - uv + v^2)^{1/2} - u - v]^{1/2}\}$$

wherein $$u = [\Pi^2/2 + [\Pi^4/4 + (4/3)^3]^{1/2}]^{1/3} \text{ and}$$

$$v = [\Pi^2/2 - [\Pi^4/4 + (4/3)^3]^{1/2}]^{1/3}.$$

The matrix $\underline{A} = (a_{ij})$, with $i=1, 2$ and $j \in N$, can be created with the solution function $\tau(\vartheta)$, in that fixed, predetermined values $a_{2j} = \vartheta_j$ are used in the solution function and this is also calculated. For the values $a_{ij}$ of the matrix, $a_{1j} = \tau(\vartheta_j)$ is valid. N is the standard notation for the positive integers (1, 2, 3, . . . ) The temperature T of the anode 1 at a point in time t according to step iv) of the method can be calculated by means of this matrix:

a) calculation of $\tau$: $\tau = t/t_K$, b) calculation of $\vartheta$:
selection of values $a_{1j}$, $a_{1(j+j)}$ of the matrix $\underline{A}$ with $a_{1j} \leq \tau \leq a_{1(j+j)}$ linear interpolation: $\vartheta = a_{2j} + \Delta\vartheta/\Delta\tau(t - a_{1j})$, whereby the following is true: $\Delta\vartheta = a_{2(j+1)} - a_{2j}$ and $\Delta\tau = a_{1(j+j)} - a_{ij}$, c) calculation of T: $T = \vartheta/T_K$ The calculation of the time in which the anode 1 exhibits a predetermined temperature ensues analogous to the step iv) executed above. The implementation of the above steps iv) a) through c) shows that the necessary calculation effort and the calculation time connected with this are low, in particular given repeated calculations of T or t. This exemplary embodiment shows that a simple adaptation of the method to modified values of the parameters of the x-ray apparatus is possible. Only the matrix $\underline{A}$ as well as the scaling factors $T_K$ and $t_k$ have to be newly calculated. The calculation method of the step iv) remains the same. The precision of the method can be arbitrarily adjusted via a suitable selection of the values $\Delta\vartheta$ as well as via selection of a suitable approximation method.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for calculating at least one of a temperature of a solid body or a time needed for a change of the temperature of the solid body, comprising the following steps:
   i) defining a differential equation $dT/dt = b - aT^4 - cT$ wherein
   T is the temperature of a solid body
   t is time
   b is per unit time temperature change caused by energy absorption $\Delta T_{EA}$,
   $aT^4$ is the per unit time temperature change $\Delta T_{ES}$ caused by heat radiation, and
   cT is the per unit time temperature change caused by conductance of heat $\Delta T_{WA}$,
   ii) converting the differential equation into the following dimension-free (dimensionless) differential equation:

$d\vartheta/d\tau = 1 - \pi\vartheta - \vartheta^4$ wherein
   $\vartheta$ is dimensionless temperature
   $\tau$ is dimensionless time,
   $\pi$ is dimensionless heat conductivity,
   iii) determining, and programming a computer with a function $\vartheta(\tau)$ or its inverse function $\tau(\vartheta)$ that is a solution to the dimensionless differential equation, and compiling a matrix $\underline{A} = (a_{ij})$, with $i=1, 2$; $j \in N$; $a_{ij} = \tau_j$ and $a_{1j} = \vartheta_j$, for which $\vartheta(\tau)$ at the values $\tau_j$ makes: $\vartheta_j = \vartheta(\tau_j)$ and $\tau(\vartheta)$ at the values $\vartheta_j$ makes $\tau_j = \tau(\vartheta_j)$;
   iv) in the computer, electronically determining at least one of the temperature T by
   a) calculating $\tau$ for t,
   b) calculating $\vartheta$ using the values contained in $\underline{A}$, and
   c) calculating T for the values calculated in step d) for $\vartheta$, or the time t by
   d) calculating $\vartheta$ for T,
   e) calculating $\tau$ using the values contained in $\underline{A}$, and
   f) calculating t for the values calculated in step e) for $\tau$; and
   v) controlling energy consumption of the solid body using the electronically determined temperature T.

2. A method as claimed in claim 1 comprising treating $\Delta T_{WA}$ as negligible.

3. A method as claimed in claim 1 comprising employing $\pi$ as being independent of energy consumption of the solid body.

4. A method as claimed in claim 1 comprising employing an anode of an x-ray tube as said solid body.

5. A method as claimed in claim 4 comprising employing an anode rotatably mounted by a bearing in said x-ray tube as said solid body.

6. A method as claimed in claim 5 comprising consideration $\Delta T_{WA}$ as being caused by heat dissipation in said bearing.

7. A method as claimed in claim 4 comprising considering $\Delta T_{WA}$ as being caused by absorption of electrons by said anode.

8. A method as claimed in claim 4 comprising considering $\Delta T_{WA}$ as being caused by heat dissipation to a coolant associated with said x-ray tube.

9. A method as claimed in claim 1 comprising controlling energy consumption of said solid body by comparing said temperature T with a limit value for said temperature T.

10. A method as claimed in claim 1 comprising controlling energy consumption of said solid body by comparing said time t with a limit value for said time t.

* * * * *